United States Patent
Hamasaki et al.

(10) Patent No.: US 7,986,947 B2
(45) Date of Patent: Jul. 26, 2011

(54) DEVICE MANAGEMENT NETWORK WITH SUPPORT FOR ROAMING

(75) Inventors: Glenn Hamasaki, Aliso Viejo, CA (US); Bindu Rama Rao, Laguna Niguel, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1284 days.

(21) Appl. No.: 11/478,108

(22) Filed: Jun. 28, 2006

(65) Prior Publication Data

US 2007/0021113 A1 Jan. 25, 2007

Related U.S. Application Data

(60) Provisional application No. 60/695,167, filed on Jun. 28, 2005.

(51) Int. Cl.
*H04W 4/24* (2009.01)
*H04W 36/28* (2009.01)
*H04W 88/06* (2009.01)

(52) U.S. Cl. .................. 455/432.1; 455/410; 726/14

(58) Field of Classification Search .................. None
See application file for complete search history.

(56) References Cited

U.S. PATENT DOCUMENTS

| | | | |
|---|---|---|---|
| 5,953,653 A * | 9/1999 | Josenhans et al. | 455/410 |
| 6,011,973 A * | 1/2000 | Valentine et al. | 455/456.6 |
| 6,625,451 B1 * | 9/2003 | La Medica et al. | 455/434 |
| 7,165,173 B1 * | 1/2007 | Herle | 713/151 |
| 2003/0162533 A1 * | 8/2003 | Moles et al. | 455/419 |
| 2004/0072578 A1 * | 4/2004 | Keutmann et al. | 455/456.1 |
| 2005/0135286 A1 * | 6/2005 | Nurminen et al. | 370/310 |
| 2005/0198379 A1 * | 9/2005 | Panasyuk et al. | 709/239 |
| 2005/0228874 A1 * | 10/2005 | Edgett et al. | 709/220 |
| 2005/0233733 A1 * | 10/2005 | Roundtree et al. | 455/414.1 |
| 2006/0068786 A1 * | 3/2006 | Florence | 455/435.2 |
| 2006/0079224 A1 * | 4/2006 | Welnick et al. | 455/432.1 |
| 2006/0106806 A1 * | 5/2006 | Sperling et al. | 707/10 |
| 2006/0223528 A1 * | 10/2006 | Smith | 455/432.3 |
| 2009/0219848 A1 * | 9/2009 | Lohmar et al. | 370/312 |

* cited by examiner

*Primary Examiner* — Rafael Pérez-Gutiérrez
*Assistant Examiner* — Frank Donado

(57) ABSTRACT

A device management network that supports roaming selectively conducts device management activities on a mobile device when it is roaming. The mobile device is capable of determining that it is roaming and communicating the information to the DM server in order to allow the DM server to execute an operator specified policy (or policies) to determine if device management activities need to be conducted when the device is roaming. Later, when the mobile device is no longer roaming, but back in the home network, then the mobile device communicates another message to the DM server to inform it (or other servers that need to know) that the mobile device is no longer roaming. In another embodiment, the DM server is capable of detecting that the mobile device is roaming and acts according to policies.

18 Claims, 1 Drawing Sheet

DEVICE MANAGEMENT NETWORK WITH SUPPORT FOR ROAMING

RELATED APPLICATIONS

The present application makes reference to, claims priority to, and claims benefit of U.S. Provisional Patent Application Ser. No. 60/695,167 entitled "DEVICE MANAGEMENT NETWORK WITH SUPPORT FOR ROAMING" filed Jun. 28, 2005, the complete subject matter of which is hereby incorporated herein by reference, in its entirety.

The present application makes reference to PCT Application with publication number WO/02/41147A1, PCT number PCT/US01/44034, filed Nov. 19, 2001, and to U.S. Provisional Patent Application Ser. No. 60/249,606, filed Nov. 17, 2000, the complete subject matter of each of which is hereby incorporated herein by reference, in its entirety.

The present application also makes reference to U.S. patent Ser. No. 11/247,463, with, titled 'SECURITY FOR DEVICE MANAGEMENT AND FIRMWARE UPDATES IN AN OPERATOR NETWORK', filed on Oct. 11, 2005, which is based on a provisional with the same title filed on 15th Oct. 2004, the complete subject matter of each of which is hereby incorporated herein by reference, in their entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Electronic devices, such as mobile phones and personal digital assistants (PDA's), often contain firmware and application software that are either provided by the manufacturers of the electronic devices, by telecommunication carriers, or by third parties. If firmware or firmware components are to be changed in electronic devices, it is often very tricky to update the firmware components. Device management of electronic devices (such as mobile handsets) in an operator's network provides the means by which problems with a mobile handset can be diagnosed and fixed using firmware updates. However, if a mobile phone is not in the home network, conducting device management will often incur extra charges, due to the inclusion of roaming charges. A subscriber is not likely to be happy if the addition of roaming charges is likely to make device management expensive, if not prohibitive.

It is often difficult to determine what is wrong with a device when a problem is encountered. This conducting device management to determine what is wrong with the device, especially when the device is "roaming", i.e. incurring roaming charges, is likely to make the subscriber, or an operator, unhappy. Conducting any device management is likely to be expensive when a user is roaming, especially if they involve downloading large files or transferring a lot of information, etc.

Server side solutions in an operator's network generally do not support anything to do with roaming. Similarly, the OMA DM based devices generally do not provide any indication that they are roaming, either to a user or to the DM server. Thus, there is no "roaming sensitivity" in device management solutions, in general.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A device, system and/or method supporting roaming sensitivity for device management operations on electronic devices, substantially as shown in and/or described in connection with at least one of the figures, as set forth more completely in the claims.

These and other advantages and novel features of the present invention, as well as details of an illustrated embodiment thereof will be more fully understood from the following description and drawings.

DETAILED DESCRIPTION OF THE INVENTION

Figure 1:
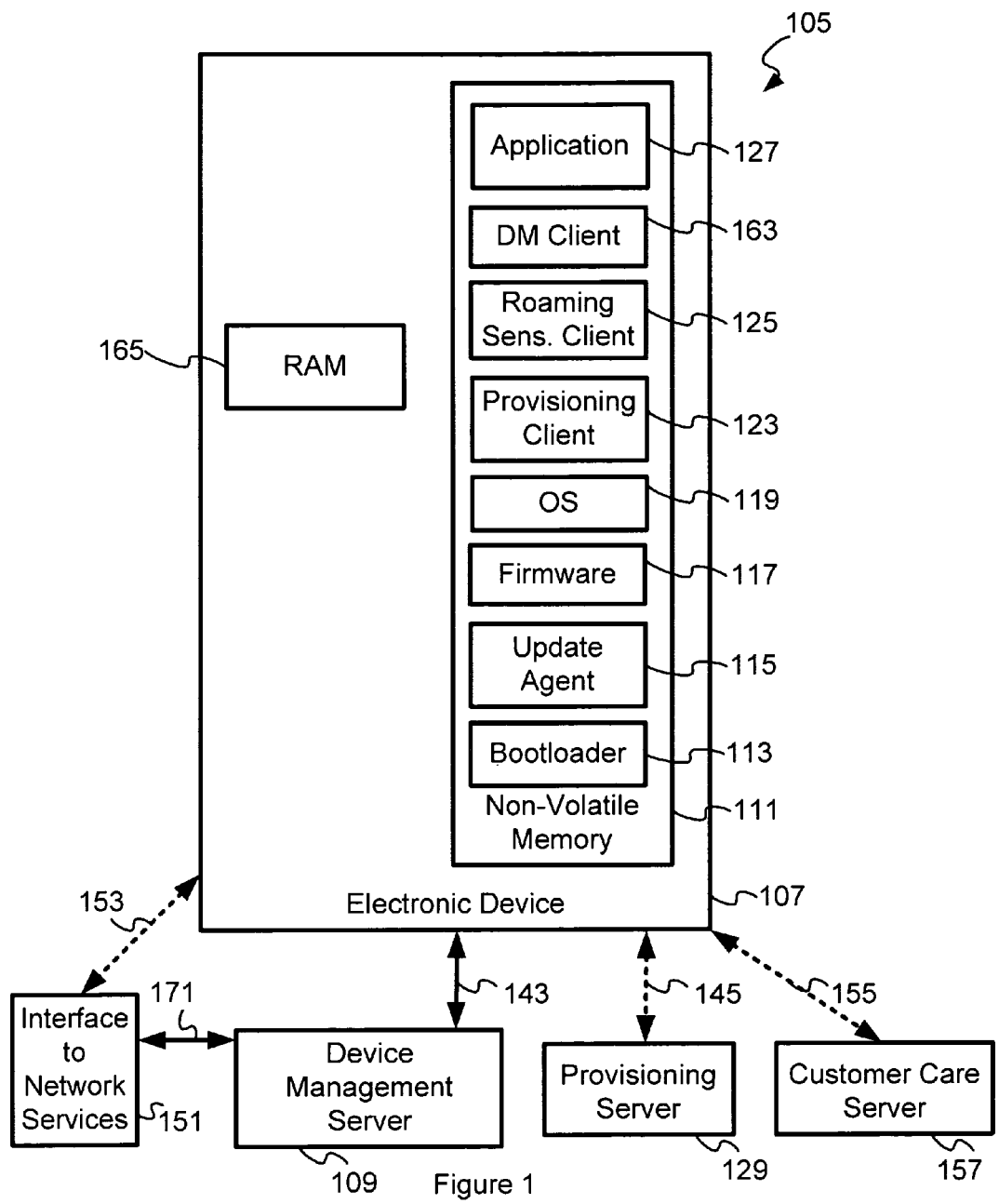
FIG. 1 is a perspective block diagram of a device management network that is capable of supporting roaming by selectively conducting device management activities when a mobile device is roaming.

Aspects of the present invention relate to the configuration, management and updating of configuration parameters, firmware and/or software in a mobile electronic device that is capable of roaming. More specifically, aspects of the present invention relate to incorporating roaming sensitivity in device management, for example not initiating firmware updates if a mobile electronic device is determined to be currently roaming. Although the present application refers frequently to an electronic device in terms of a cellular phone, a pager, a personal digital assistant, or a personal computer, this does not represent a specific limitation of the present invention. A mobile electronic device for the purposes of the present application may comprise a wide variety of electronic devices having updatable code and/or configuration parameters that may be managed via a wired or wireless communications link using a device client resident in the electronic device. Although the following makes reference to the Open Mobile Alliance (OMA) protocols and specifications, representative embodiments the present invention may be applied in combination with other industry standard protocols.

FIG. 1 is a perspective block diagram of a device management network 105 that is capable of supporting roaming by selectively conducting device management activities when a mobile device is roaming. Device management on a mobile device is conducted on the mobile device by the device management network based on a roaming policy.

The device management network 105 is capable of conducting device management activities, such as firmware updates, software updates etc., in order to fix problems in the mobile device or to upgrade the mobile device. The device management network 105 comprises a device management (DM) server 109, a customer care server 157, an interface to network services 151, the mobile device 107 and a provisioning server 129. The mobile device 107 is capable of updating an application software 127, an operating system (OS) 119, or a firmware 117 in the mobile device 107 employing an update package delivered by the DM server 109 or a download server in the network. It is also capable of receiving provisioning information from the customer care server 157 or the provisioning server 129 to fix configuration problems or reconfigure software and hardware, even if the mobile device is determined to be roaming.

The mobile device 107 is capable of applying updates using one or more update agents 115 that are each capable of processing update packages or subsets thereof. The mobile device 107 is capable of receiving update packages, content of different kinds, configuration parameters, etc. It comprises the update agent(s) 115 that is capable of updating the mobile device 107, a roaming sensitivity client 125 that facilitates determination of "roaming" when the device is roaming, and a provisioning client 123 used to conduct bootstrap provisioning and continuous provisioning.

The mobile device 107 also comprises a DM client 163 that is capable of interacting with the provisioning client 123, the roaming sensitivity client 125, and other clients in the device, such as a diagnostic client and a traps client. The DM client 163 typically received DM commands from the DM server 109 and implements them, even if the device is roaming, unless the operator has a policy that prohibits management tasks while the device is roaming, or a user instructs the device (or the DM server) to not conduct management sessions while the device is determined to be roaming.

In one embodiment, the mobile device is capable of determining that it is roaming and communicating the information to the DM server in order to allow the DM server to execute an operator specified policy (or policies) to determine if device management activities need to be conducted when the device is roaming. Later, when the mobile device is no longer roaming, but back in the home network, then the mobile device communicates another message to the DM server to inform it (or other servers that need to know) that the mobile device is no longer roaming.

In another embodiment, the mobile device is not capable of determining that it is roaming and cannot communicate such information to the DM server. The DM server, or some other server in an operator's network, determines that the mobile device is roaming. In order to allow the DM server to execute an operator specified policy (or policies) to determine if device management activities need to be conducted when the device is roaming, the DM server or the some other server communicates information regarding roaming, such as a device roaming event (with the roaming network information) to the DM server. Based on such events received, the DM server can track the device if necessary, and also determine if device management should be conducted with the device based on the roaming network currently involved, and also based on the urgency of conducting the DM activity. The DM server is also capable of buffering up (i.e. queuing up) device management activities that have been deferred for a roaming mobile device, until the device gets back to the home network, or until the activities time out or are no longer deemed necessary.

In yet another embodiment, the mobile device is capable of determining that it is roaming and is able to communicate such information to the DM server. In addition, the mobile network is also capable of determining that it the mobile device is roaming and it communicates such information to the DM server. The DM server (or some other server associated with the DM server) tracks the roaming status of the mobile device, and, based on the operator's policies, as determined by policies maintained by the DM server (or a policy server associated with the DM server) defers some or all device management tasks that need to be conducted on the device that is currently roaming. Management tasks are deferred for the duration of "roaming". When the user's mobile device is detected to have come back to the home network (default network), the deferred management tasks are automatically conducted. In a related embodiment, the user's approval is solicited before conducting the deferred management tasks. In another related embodiment, the user/subscriber with the device in a "roaming network" is prompted (for some management tasks, such as firmware update or software download) with an appropriate message indicating the need to conduct a management task and the user's approval is solicited. For example, a message such as, "Do you want to conduct a management task while roaming"? is displayed, prompting the user to select "Yes" or "No". Based on user input, the associated management tasks are selectively conducted.

In a different embodiment, neither the mobile device nor the operator's network is capable of determining that the mobile device is roaming. When the DM server initiates a session with the DM client in the mobile device, it retrieves a network identification from the device. It then compares the retrieved network identification with a reference network id associated with the operator's network to determine if the mobile device is currently "roaming". If it is determined to be roaming, then the DM server defers the management task, after aborting or otherwise terminating the current session. If it is determined that the mobile device is currently not roaming, then the management session is continued until it is completed or terminated. In a related embodiment, the user's approval is solicited before conducting a management task while the device is detected to be "roaming".

In a different embodiment, if the network operator needs to update millions of mobile devices to fix a known bug (say with all devices of a make, model and version), it will be very expensive to fix bugs in the mobile devices that are roaming, especially if the operator has to bear the roaming charges. Thus, the operator needs to determine which mobile devices are not roaming and conduct management operations (such as fixing bugs) on those—the DM server facilitates both the determination of which mobile devices are not roaming, such as by retrieving a network id from the device, or by retrieving the information from a network server in the operator's network by means of a web services interface provided for that purpose. For those mobile devices determined to be currently roaming, the DM server defers the management operations, and queues them up for subsequent invocation, when the associated mobile device is determined to be not roaming.

In general, the device management network 105 supports roaming selectively and conducts device management activities on a mobile device 107 when the mobile device 107 is roaming. In one embodiment, the mobile device 107 is capable of determining that it is roaming and communicating the information to the DM server in order to allow the DM server to execute an operator specified policy (or policies) to determine if device management activities need to be conducted when the mobile device 107 is roaming. Later, when the mobile device 107 is no longer roaming, but back in the home network, then the mobile device communicates another message to the DM server to inform it (or other servers that need to know) that the mobile device 107 is no longer roaming. In another related embodiment, the DM server is capable of detecting that the mobile device 107 is roaming and acts according to policies specified by the operator (or the user).

The present invention provides for checking a policy (at least one) of the operator, if one exists, to determine if a management operation can be started when the mobile device is roaming. It also provides for prompting the user for authorization to conduct the management operation, if a policy of the operator does not exists, to determine if a management operation can be started while the device is roaming. Management operations comprise of firmware updates, configuration changes, continuous provisioning, software component download and installation and diagnostics and monitoring.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein. The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form. While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. An electronic device supporting communication with a device management system, the electronic device comprising:
communication circuitry that enables wireless communication with at least the device management system via a wireless network;
at least one memory containing machine-readable code executable by a processor;
at least one processor operably coupled to the communication circuitry and the at least one memory;
wherein the machine-readable code comprises a code portion that is executed by the at least one processor to determine if the electronic device is roaming and automatically inform the device management system that the electronic device is roaming;
wherein a network operator policy is used by the electronic device in order to allow at least one type of fix to known bugs for the electronic device that needs to be conducted when the electronic device is roaming and to prohibit at least one type of management operation until later when the electronic device is no longer roaming, but back in the operator's home network;
queuing up the at least one prohibited management operation;
evaluating a policy specified by the network operator to determine if a particular management operation must be conducted while the mobile device is roaming; and
initiating the particular management operation on the mobile device selectively based on the evaluation, if the mobile device is determined to be currently roaming; and
wherein evaluating includes:
checking a policy of a user in addition to the policy specified by the network operator, if one exists, to determine if a management operation can be started when the mobile device is roaming; and
prompting the user for authorization to conduct the management operation, if a policy of the user does not exists, to determine if a management operation can be started while the mobile device is roaming.

2. The electronic device according to claim 1, wherein the electronic device is capable of conducting various types of management operations initiated by the device management system and wherein the code portion communicates the roaming information to the device management system when it determines that the electronic device is roaming in order to prohibit at least one type of the various types of management operations from being initiated on the electronic device by the device management system.

3. The electronic device according to claim 1 wherein the policy provided by the wireless network is used by the electronic device to determine if a management operation initiated by the device management system while the electronic device is roaming must be initiated.

4. The electronic device according to claim 3 wherein the policy prohibits execution of management tasks while the electronic device is roaming.

5. The electronic device according to claim 1 wherein the electronic device, based on a user policy, refrains from conducting management operations initiated by the device management system while the electronic device is determined to be roaming.

6. The electronic device according to claim 5, the electronic device further comprising:
a roaming sensitivity client;
the roaming sensitivity client facilitating the determination of roaming by the electronic device when the electronic device is roaming; and
the electronic device inhibiting the execution of at least one type of management operation when the roaming sensitivity client facilitating determines that the electronic device is roaming.

7. The electronic device according to claim 6 wherein the at least one type of management operation comprises firmware update, bootstrap provisioning and continuous provisioning.

8. The electronic device according to claim 7 wherein the electronic device communicates a message to the device management system to inform it that the electronic device is no longer roaming when the electronic device determines that is has stopped roaming.

9. The electronic device according to claim 1 wherein the code portion of the electronic device determines that the electronic device is roaming when the device management system, that is capable of detecting that the electronic device is roaming, informs the code portion that the electronic device is currently roaming.

10. A device in an operator's network for managing a mobile device, the device comprising: a processor;
a processor; and
a memory coupled to the processor, wherein the memory includes computer-executable instructions stored thereon executed by the processor to:

utilize a policy specified by the network operator that can be used to determine if device management activities can be conducted on the mobile device when the mobile device is roaming;

conduct the device management activities on the mobile device when it determines that the mobile device is not roaming;

allow at least one type of fix to known bugs for the mobile device that needs to be conducted when the mobile device is roaming while refraining from conducting at least one type of management activity on the mobile device when it determines, based on the network operator policy, that the mobile device is currently roaming until later when the mobile device is no longer roaming, but back in the operator's home network;

queue up the refrained at least management activity;

evaluate a policy specified by the network operator to determine if a particular management activity must be conducted while the mobile device is roaming; and initiate the particular management activity on the mobile device selectively based on the evaluation, if the mobile device is determined to be currently roaming; and wherein evaluating includes:

checking a policy of a user in addition to the policy specified by the network operator, if one exists, to determine if a management activity can be started when the mobile device is roaming; and prompting the user for authorization to conduct the management activity, if a policy of the user does not exists, to determine if a management activity can be started while the mobile device is roaming.

11. The device of claim 10 wherein the device buffers up certain device management activities for the mobile device when it determines that the mobile device is currently roaming.

12. The device of claim 11 wherein the device conducts device management activities that were previously buffered up when the mobile device was determined to be roaming, when the device determines that the mobile device is no longer roaming.

13. The device of claim 10 further comprising:

receiving a device roaming event message from the mobile device indicating that the mobile device is currently roaming; and tracking of the roaming status of the mobile device by the device based on the device roaming event message.

14. The device of claim 13 further comprising:

the device determining if device management should be conducted on the mobile device based on the roaming network currently being used by the mobile device while it is roaming.

15. The device of claim 13 further comprising:

the device determining if device management activities should be conducted on the mobile device based on the urgency of conducting the device management activities.

16. The device of claim 15 further comprising:

the device queuing device management activities that have been deferred for the mobile device while it is roaming, until the device gets back to a home network, or until the activities time out or are no longer deemed necessary.

17. A method of conducting device management of a mobile device, the method comprising:

determining if the mobile device is roaming;

conducting any management operation on the mobile device if the mobile device is determined not to be roaming;

selectively allowing at least one type of fix to known bugs for the mobile device that needs to be conducted when the mobile device is roaming while prohibiting at least one management operation on the mobile device if the mobile device is determined to be roaming until later when the mobile device is no longer roaming, but back in a network operator's home network;

queuing up the at least one prohibited management operation;

evaluating a policy specified by the network operator to determine if a particular management operation must be conducted while the mobile device is roaming; and initiating the particular management operation on the mobile device selectively based on the evaluation, if the mobile device is determined to be currently roaming; and wherein evaluating includes:

checking a policy of a user in addition to the policy specified by the network operator, if one exists, to determine if a management operation can be started when the mobile device is roaming; and prompting the user for authorization to conduct the management operation, if a policy of the user does not exists, to determine if a management operation can be started while the mobile device is roaming.

18. The method of conducting device management according to claim 17, the method further comprising:

discovering that the mobile device is no longer roaming; and executing the at least one queued management operation on the mobile device if it is determined that the management operation is still necessary and has not timed out.

* * * * *